United States Patent [19]

Orosz et al.

[11] 4,335,898
[45] Jun. 22, 1982

[54] LOAD SHIFTER ASSEMBLY FOR TRAILERS

[75] Inventors: Andrew Orosz; Kenneth Lesarge, both of Regina, Canada

[73] Assignee: Westank-Willock, a Division of Willock Industries Ltd., Regina, Canada

[21] Appl. No.: 148,697

[22] Filed: May 12, 1980

[51] Int. Cl.³ .............................................. B62D 53/00
[52] U.S. Cl. .............................. 280/81 R; 180/24.02; 280/405 A
[58] Field of Search .............. 280/81 R, 81 A, 405 A; 180/24.02, 209

[56] References Cited

U.S. PATENT DOCUMENTS

| 2,741,489 | 4/1956 | Bigge | 280/81 R |
| 2,772,893 | 12/1956 | Wettstein | 280/405 A |
| 2,919,928 | 1/1960 | Hoffer | 280/81 R |
| 3,112,935 | 12/1963 | Gregg | 280/81 R |
| 3,191,962 | 6/1965 | Coordes | 280/81 R |
| 3,542,390 | 11/1970 | Fikse | 280/81 A |
| 3,860,257 | 1/1975 | Mesly | 280/81 A |
| 3,895,818 | 7/1975 | Fearon | 180/24.02 |
| 4,031,976 | 6/1977 | Lambert | 180/24.02 |
| 4,161,325 | 7/1979 | Schneider | 180/24.02 |
| 4,226,437 | 10/1980 | Trudeau | 280/81 R |

Primary Examiner—Joseph F. Peters, Jr.
Assistant Examiner—John A. Carroll
Attorney, Agent, or Firm—S. G. Ade

[57] ABSTRACT

A tandem axle load shifter is detachably engageable on the rear end of a trailer and includes a suspension frame assembly with tandem axles and wheels, connected to a pick-up frame assembly by means of a turntable for self-steering purposes. The pick-up frame assembly is detachably secured to the rear end of the trailer and has a guide wheel journalled on the underside thereof. A curved and ramped rail is secured to the suspension frame forwardly of the wheels and engages the guide wheels so that when the suspension frame turns, the rail rides up the wheel and the loading of the rail on the guide wheel assists the suspension frame assembly to return to the central position when the turn is completed. The mounting of the turntable is such that the vertical axis thereof is forwardly of the horizontal center line between the two axles thus giving a castoring effect to the suspension portion of the assembly which assists in maintaining the straight ahead trailing relationship of the assembly relative to the trailer under normal conditions.

24 Claims, 5 Drawing Figures

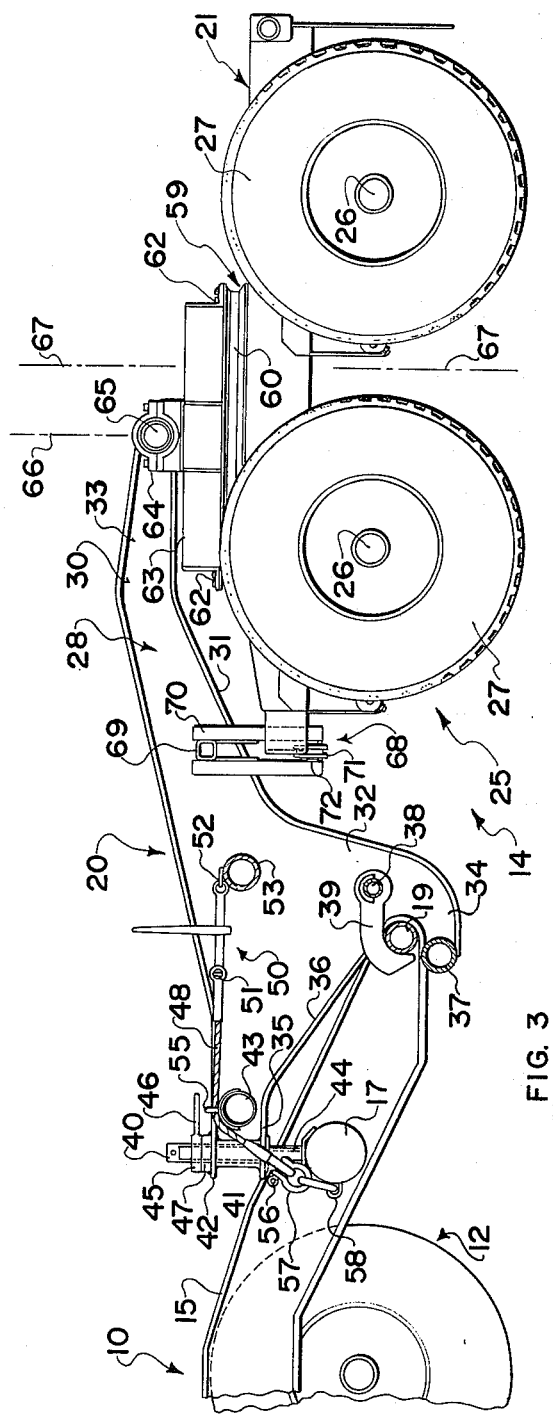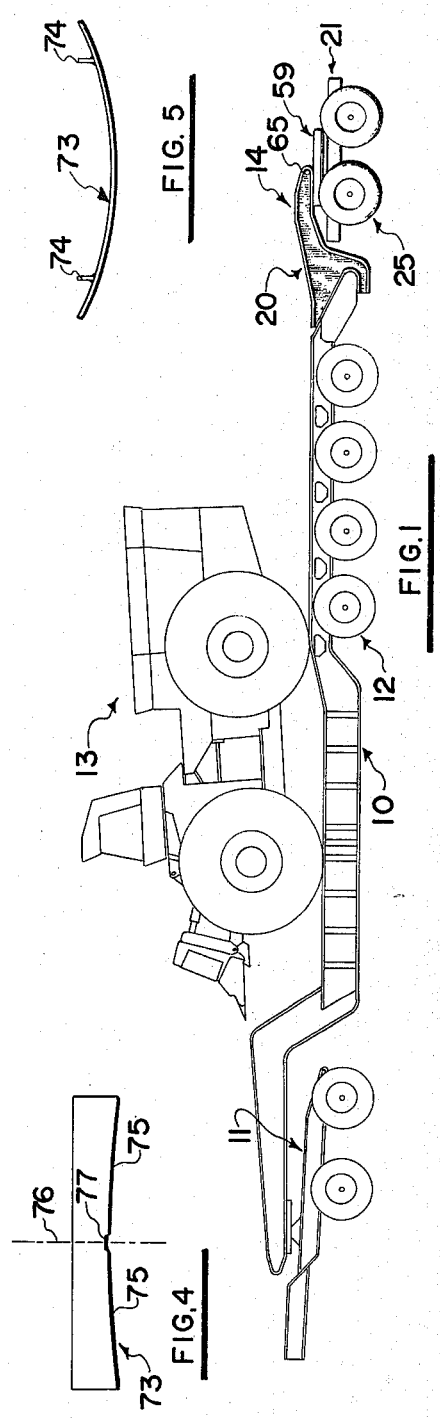

LOAD SHIFTER ASSEMBLY FOR TRAILERS

BACKGROUND OF THE INVENTION

This invention relates to new and useful improvements in load shifting assemblies normally used with heavy duty trailers and examples of such devices include U.S. Pat. Nos. 4,161,325, 3,700,255, 2,772,892 and 2,741,409.

U.S. Pat. No. 4,161,325 shows a supplementary support for vehicles for the reduction of load which comprises lever arms, a cam member, a cam roller and associated components. U.S. Pat. No. 3,700,255 discloses a pivotal axle which prevents scuffing of tires during the turning operation, by yielding to a normal course with respect to the direction of trarms, a cam member, a cam roller and associated components. U.S. Pat. No. 3,700,255 discloses a pivotal axle which prevents scuffing of tires during the turning operation, by yielding to a normal course with respect to the direction of travel and the other two patents disclose load distributing vehicles or trailers.

As taught by these patents, the main function of a load shifting device is to relieve the running gear of the trailer, of a certain amount of imposed payload so that larger payloads can be legally be hauled on highways, the majority of which are subjected to weight limitations per axle or per wheel.

In order to be effective and to reduce the drag on the tires and also to decrease the turning radius, a load shifter must have self-steering capabilities and although there are several different designs of self-steering gears available for load shifters, most of them suffer from certain disadvantages such as involved construction, many wear areas particularly when used in dusty or dirty conditions and somewhat inefficient self-centering actions.

SUMMARY OF THE INVENTION

The present invention overcomes disadvantages inherent in conventional load shifters and in accordance with the invention there is provided a load shifter assembly for heavy duty trailers which comprises a pick-up frame, means to detachably secure said pick-up frame to the rear end of the trailer, a suspension frame mounted on a twin-axle-and-road-wheel assembly. Means are provided mounting the suspension frame to the pick-up frame for pivotal movement in a substantially horizontal plane relative to the pick-up frame and self-centering means are provided operatively extending between the suspension frame and the pick-up frame for assisting said suspension frame in returning to the in-line trailing position relative to the trailer.

Another advantage of the present invention is that the connection between the pick-up frame and the suspension frame is preferably situated just forwardly of the transverse center line between the twin axles so that a castoring effect is provided which assists in maintaining the assembly in the true trailing relationship behind the trailer and tends to eliminate the wandering of the load shifter assembly.

Another advantage of the present invention is the ease of connecting and disconnecting same from the rear end of a trailer assembly.

A still further advantage of the present invention is to provide a device of the character herewithin described which is simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the preferred typical embodiment of the principles of the present invention, in which:

DESCRIPTION OF THE DRAWINGS

FIG. 1 is a side elevation of a conventional trailer with a load thereon and showing the load shifting device secured to the rear end thereof.

FIG. 3 is a section substantially along the line 3—3 of FIG. 2.

FIG. 4 is an enlarged front elevation of the curved rail per se.

FIG. 5 is a plan view of FIG. 4.

In the drawings like characters of reference indicate corresponding parts in the different figures.

DETAILED DESCRIPTION

Figure 2:
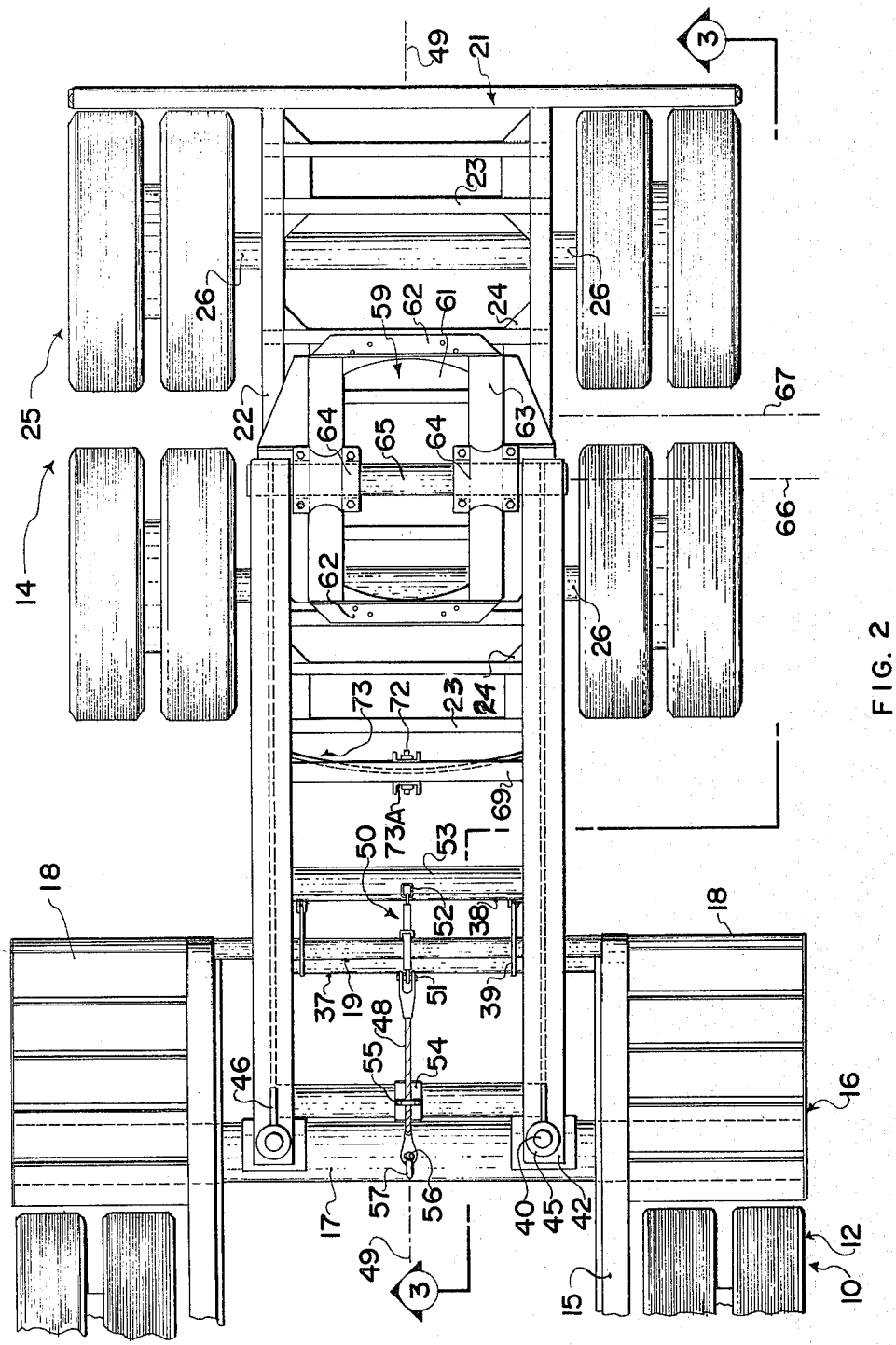
FIG. 2 is a plan view of the load shifting assembly secured to the rear end of the trailer.

Reference should first be made to FIG. 1 in which 10 illustrates generally, a conventional heavy duty trailer mounted upon a front wheeled assembly collectively designated 11 and supported at the rear by a plurality of road engaging wheels collectively designated 12 all of which are conventional. An example of a load which may be carried by such a trailer, is indicated by reference character 13.

The invention collectively designated 14 is detachably secured to the rear end of the trailer as clearly shown in FIG. 1 and in more detail in FIGS. 2 and 3.

The rear end of the trailer 10 curves downwardly as clearly shown and includes a pair of spaced and parallel side members 15 with inclined wing ramps collectively designated 16 extending upon either side thereof. These are in part supported by a transverse heavy duty tube 17 spanning the side frame members 15 inboard from the rear extremity 18 of the trailer, the ends of said tube extending beyond the side frames as shown in FIG. 2.

A further transverse tube 19 extends between the rear ends of the side frames 15 and is secured thereto as by welding, said tube 19 also being shown in FIGS. 2 and 3.

The invention collectively designated 14 includes a pick-up frame collectively designated 20 and a suspension frame collectively designated 21. The suspension frame includes a pair of spaced and parallel longitudinally extending frame members 22 and cross members 23 extending therebetween with strengthening gussets 24 being provided where necessary.

A twin-axle-and-road-wheel assembly is provided and is collectively designated 25. It is conventional in construction and includes spaced and parallel transverse axles 26 with ground engaging wheels 27 being journalled thereon in the usual way and with the axles being secured to the underside of the frame 21 in a conventional manner (not illustrated).

The pick-up frame 20 comprises a pair of spaced and parallel side members collectively designated 28 with transverse members 29 extending therebetween and being secured thereto and also including strengthening gussets 30 where required. Each of these side members 28 include a vertical web 30 and upper and lower horizontal flanges 31 secured to the upper and lower edges of the web so that they are in the form of I-beams but shaped as clearly illustrated in FIG. 3 with a main body portion 32 extending rearwardly and upwardly to terminate in a relatively narrow tail section 33.

The front portion of each of the side beams includes a lower forwardly facing hooked portion 34, an upper leading portion 35 and an inclined front edge 36 extending therebetween as clearly shown.

A transversely situated tube 37 is welded to the lower ends of the U-shaped portion 34 and extends between the two portions of the side frame as clearly illustrated and a further tube 38 extends between the side members 28 upon which are mounted a pair of hooks 39 which engage over the cross tube 19 spanning the rear ends of the side members 15 of the trailer when the assembly 14 is in position upon the trailer.

Screw threaded mounting pins 40 screw threadably engage sockets 41 extending between the leading ends 35 of the side members and support plates 42 extending forwardly from a further tubular member 43 which spans the side members 28 adjacent the leading ends 35 thereof and the unthreaded inner ends 44 of these screw threaded pins 40 engage within vertical apertures (not illustrated) formed in the side members 15 of the trailer. The pins are screwed downwardly and then locked in position by means of a lock nut 45 engaging around the screw threaded portion of pins 40 and actuated by extending member 46. The lock nut 45 binds against a fixed nut 47 secured upon the upper side of the plates 42.

The attachment of the pick-up frame 20, to the trailer, is completed by the provision of a flexible cable 48. In this embodiment, the cable lies on the longitudinal axis 49 of the trailer and of the pick-up frame. A conventional ratchet binder assembly 50 is secured to one end of the cable by means of cross pin 51 and to a link 52 extending from a further cross tube 53 extending between the side plates 28 of the pick-up assembly.

The cable passes over a wear pad 54 upon cross tube 43 and also through an apertured guide lug 55 extending upwardly from the tube 43, to be secured by cross pin 56 to links 57 which in turn are secured to an apertured connector 58 secured to and extending forwardly from cross tube 17 as clearly shown in FIG. 3.

The ratchet binder is used to tension the cable 48 and to hold the U-shaped ends 34 of the side plates 28, against the cross tube 19 at the rear end of the trailer.

Means are provided to pivotally secure the suspension frame 21 to the pick-up frame 20 so that the suspension frame together with the twin axles and wheels thereof, can pivot in a substantially horizontal plane. Although other methods can be used, the preferred method is by the provision of a turntable assembly collectively designated 59. The lower portion is mounted upon the upper side of the suspension frame 21 and is indicated by reference character 60. The upper portion or turntable mounting assembly 61 is rotatable relative to the lower portion 60 in a conventional manner so that details are not believed necessary. This upper turntable mounting portion 61 is situated between transversely situated spaced and parallel angle members 62 and end members 63. Pillow block assemblies 64 are secured from the upper sides of the end members 63 and a cross shaft or spindle 65 is journalled between these pillow blocks with the ends of the shaft being secured within the trailing ends 33 of the side members 28. This permits pivotal movement of the suspension frame around a transverse axis within limits as will hereinafter be described.

It should be noted that it is desirable that the vertical axis 66 of this pivotal connection is situated forwardly of the transverse center line 67 between the front and rear axles 26 thus giving a slight castoring action to the suspension frame which assists in maintaining the suspension frame portion in in-line trailing relationship with the trailer when the trailer is travelling straight ahead and helping to eliminate any wandering or wobble which might occur.

As will be appreciated from the foregoing, when the load shifting assembly is secured to the rear end of the trailer as hereinbefore described, the suspension frame portion 21 is of a self-steering nature because of the turntable mounting same relative to the pick-up frame 20.

Self-centering means collectively designated 68 are provided between the suspension frame 21 and the pick-up frame 20 in order to assist the suspension frame assembly to return to the in-line centered position after a turn has been completed.

A transversely situated mounting bracket 69 extends between the side frames 28 of the pick-up frame and a pair of spaced and parallel vertically situated channel members 70 are secured by the upper ends thereof to this member 69 and depend downwardly substantially along the aforementioned longitudinal axis 49.

Guide means preferably taking the form of a grooved wheel or pulley 71 is journalled for rotation upon a mounting pin 72 extending between the webs 73A of the channels 70 adjacent the lower end thereof.

A curved rail collectively designated 73 is mounted on the front end of the suspension frame forwardly of the ground wheels and details of this rail are shown in FIGS. 4 and 5.

The rail is curved when viewed in plan with a radius substantially equivalent to the distance between the vertical center line 66 of the turntable and the guide wheel 71 and attaching plates 74 extend from inside the curvature to secure the rail to the front of the suspension frame. However, this attachment is not shown in the drawings, but is conventional and can be either by welding or by nut and bolt assemblies.

The underside edge of the vertically situated plate forming the rail, is inclined as indicated by reference character 75 in FIG. 4 with these inclined lower edges forming ramps which extend outwardly and downwardly from the center 76 of the rail and a notch 77 is formed on this underside edge intermediate the two ramps 75 and centrally of the rail 73 and this rail engages the upper surface of the grooved wheel 71 as clearly shown in FIG. 3.

This rail and guide wheel connection equalizes the load on the two axles and also makes the load shifter trailing more positive. It will be appreciated that as the load shifter turns due to a turning action of the prime mover and the trailer, the rail remains engaged with the wheel because of the considerable weight present at this point so that in effect the wheel climbs the ramps 75 although it is the rail that is moving.

As soon as the prime mover and trailer straighten out, the ramps force the rail to return to the central position relative to the guide wheel 71 which engages within the notch 77. The notch 77 maintains the rail in the central position upon the guide wheel until a predetermined turning effort is encountered and this stops any wandering of the suspension frame during straight ahead movement of the trailer.

It will be appreciated that attaching and detaching the load shifting assembly from the trailer is relatively easy and that the suspension frame together with the twin axle and wheel assembly is self-steering and self-centering due to firstly the slight castoring effect of the suspension frame and secondly, to the ramped rail engaging the transversely situated guide wheel 71 with the central notch 77 preventing wobble of the suspension frame when in the straight ahead position.

Since various modifications can be made in our invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What we claim as our invention is:

1. A load shifter assembly for heavy duty trailers comprising in combination a pick-up frame, means to detachably secure said pick-up frame to the rear end of the trailer, a suspension frame, a twin-axle-and-road-wheel assembly supporting said suspension frame, substantially vertical pivot means mounting said suspension frame to said pick-up frame for pivotal movement in a substantially horizontal plane relative to said pick-up frame, and self-centering means operatively extending between said suspension frame and said pick-up frame for assisting said suspension frame in returning to the in-line trailing position relative to the trailer, said self-centering means includes guide means mounted in said pick-up frame and a curved rail mounted across said suspension frame forwardly of the twin axles of said twin-axle-and-road-wheel assembly, said rail engaging upon said guide means, said rail curving in a substantially horizontal plane with a radius of curvature substantially equal to the distance between the substantially vertical pivot means and said rail, said rail including a ramp on each side of the center thereof, and upon the underside thereof, each ramp inclining upwardly from the outer end of said rail towards the center thereof, said ramps urging said rail to a position whereby said guide means is at the center of said rail at the junction of said ramps.

2. The invention according to claim 1 in which said means mounting said suspension frame to said pick-up frame comprises a turntable assembly operatively connecting the rear end of said pick-up frame upon said suspension frame.

3. The invention according to claim 2 in which the vertical axis of the turntable assembly is situated forwardly of the transverse center line between the twin axles of said twin-axle-and-road-wheel assembly.

4. The invention according to claim 1 in which said guide means consists of a wheel journalled for rotation within said pick-up frame and engaging said ramps.

5. The invention according to claim 2 in which said guide means consists of a wheel journalled for rotation within said pick-up frame and engaging said ramps.

6. The invention according to claim 3 in which said guide means consists of a wheel journalled for rotation within said pick-up frame and engaging said ramps.

7. The invention according to claim 1 which includes means between said ramps in the center of said rail to maintain said rail centrally engaging said guide means against movement of said rail relative to said guide means until a predetermined sideways pressure is exerted by the turning of said suspension frame, thereby assisting in maintaining the in-line trailing relationship of said suspension frame relative to said pick-up frame.

8. The invention according to claim 2 which includes means between said ramps in the center of said rail to maintain said rail centrally engaging said guide means against movement of said rail relative to said guide means until a predetermined sideways pressure is exerted by the turning of said suspension frame, thereby assisting in maintaining the in-line trailing relationship of said suspension frame relative to said pick-up frame.

9. The invention according to claim 3 which includes means between said ramps in the center of said rail to maintain said rail centrally engaging said guide means against movement of said rail relative to said guide means until a predetermined sideways pressure is exerted by the turning of said suspension frame, thereby assisting in maintaining the in-line trailing relationship of said suspension frame relative to said pick-up frame.

10. The invention according to claim 4 which includes means between said ramps in the center of said rail to maintain said rail centrally engaging said wheel against movement of said rail relative to said wheel until a predetermined sideways pressure is exerted by the turning of said suspension frame, thereby assisting in maintaining the in-line trailing relationship of said suspension frame relative to said pick-up frame.

11. The invention according to claim 5 which includes means between said ramps in the center of said rail to maintain said rail centrally engaging said wheel against movement of said rail relative to said wheel until a predetermined sideways pressure is exerted by the turning of said suspension frame, thereby assisting in maintaining the in-line trailing relationship of said suspension frame relative to said pick-up frame.

12. The invention according to claim 6 which includes means between said ramps in the center of said rail to maintain said rail centrally engaging said wheel against movement of said rail relative to said wheel until a predetermined sideways pressure is exerted by the turning of said suspension frame, thereby assisting in maintaining the in-line trailing relationship of said suspension frame relative to said pick-up frame.

13. The invention according to claim 7 in which said means between said ramps and the center of said rail consists of a vertically situated recess formed in the center of the side of said rail which is engaged by said guide means.

14. The invention according to claim 8 in which said means between said ramps and the center of said rail consists of a vertically situated recess formed in the center of the side of said rail which is engaged by said guide means.

15. The invention according to claim 9 in which said means between said ramps and the center of said rail consists of a vertically situated recess formed in the center of the side of said rail which is engaged by said guide means.

16. The invention according to claim 10 in which said means between said ramps and the center of said rail consists of a vertically situated recess formed in the center of the side of said rail which is engaged by said wheel.

17. The invention according to claim 11 in which said means between said ramps and the center of said rail consists of a vertically situated recess formed in the center of the side of said rail which is engaged by said wheel.

18. The invention according to claim 12 in which said means between said ramps and the center of said rail consists of a vertically situated recess formed in the center of the side of said rail which is engaged by said wheel.

19. The invention according to claims 1, 2 or 3 in which said pick-up frame includes a pair of spaced and parallel side members, cross members extending therebetween, said means detachably securing said pick-up frame to the rear end of the trailer includes trailer frame engaging means on each side of the underside of said side members, a pair of locating fasteners, one on each side of said pick-up frame and on the upper side thereof, engaging within the trailer adjacent the rear end thereof and an adjustable tensioning cable assembly extending from said pick-up frame substantially along the longitudinal axis thereof and being detachably securable to adjacent the rear end of said trailer also substantially along the longitudinal axis thereof.

20. The invention according to claims 4, 5 or 6 in which said pick-up frame includes a pair of spaced and parallel side members, cross members extending therebetween, said means detachably securing said pick-up frame to the rear end of the trailer includes trailer frame engaging means on each side of the underside of said side members, a pair of locating fasteners, one on each side of said pick-up frame and on the upper side thereof, engaging within the trailer adjacent the rear end thereof and an adjustable tensioning cable assembly extending from said pick-up frame substantially along the longitudinal axis thereof and being detachably securable to adjacent the rear end of said trailer also substantially along the longitudinal axis thereof.

21. The invention according to claims 7, 8 or 9 in which said pick-up frame includes a pair of spaced and parallel side members, cross members extending therebetween, said means detachably securing said pick-up frame to the rear end of the trailer includes trailer frame engaging means on each side of the underside of said side members, a pair of locating fasteners, one on each side of said pick-up frame and on the upper side thereof, engaging within the trailer adjacent the rear end thereof and an adjustable tensioning cable assembly extending from said pick-up frame substantially along the longitudinal axis thereof and being detachably securable to adjacent the rear end of said trailer also substantially along the longitudinal axis thereof.

22. The invention according to claims 10, 11 or 12 in which said pick-up frame includes a pair of spaced and parallel side members, cross members extending therebetween, said means detachably securing said pick-up frame to the rear end of the trailer includes trailer frame engaging means on each side of the underside of said side members, a pair of locating fasteners, one on each side of said pick-up frame and on the upper side thereof, engaging within the trailer adjacent the rear end thereof and an adjustable tensioning cable assembly extending from said pick-up frame substantially along the longitudinal axis thereof and being detachably securable to adjacent the rear end of said trailer also substantially along the longitudinal axis thereof.

23. The invention according to claims 13, 14 or 15 in which said pick-up frame includes a pair of spaced and parallel side members, cross members extending therebetween, said means detachably securing said pick-up frame to the rear end of the trailer includes trailer frame engaging means on each side of the underside of said side members, a pair of locating fasteners, one on each side of said pick-up frame and on the upper side thereof, engaging within the trailer adjacent the rear end thereof and an adjustable tensioning cable assembly extending from said pick-up frame substantially along the longitudinal axis thereof and being detachably securable to adjacent the rear end of said trailer also substantially along the longitudinal axis thereof.

24. The invention according to claims 16, 17 or 18 in which said pick-up frame includes a pair of spaced and parallel side members, cross members extending therebetween, said means detachably securing said pick-up frame to the rear end of the trailer includes trailer frame engaging means on each side of the underside of said side members, a pair of locating fasteners, one on each side of said pick-up frame and on the upper side thereof, engaging within the trailer adjacent the rear end thereof and an adjustable tensioning cable assembly extending from said pick-up frame substantially along the longitudinal axis thereof and being detachably securable to adjacent the rear end of said trailer also substantially along the longitudinal axis thereof.

* * * * *